(12) United States Patent
Feith et al.

(10) Patent No.: US 12,502,519 B2
(45) Date of Patent: Dec. 23, 2025

(54) LOCKING SLIDE CLAMP

(71) Applicant: CareFusion 303, Inc., San Diego, CA (US)

(72) Inventors: Raymond P. Feith, Chino Hills, CA (US); Soon Y. Park, Cypress, CA (US)

(73) Assignee: CAREFUSION 303, INC., San Diego, CA (US)

( * ) Notice: Subject to any disclaimer, the term of this patent is extended or adjusted under 35 U.S.C. 154(b) by 719 days.

(21) Appl. No.: 17/892,912

(22) Filed: Aug. 22, 2022

(65) Prior Publication Data
US 2023/0054930 A1   Feb. 23, 2023

Related U.S. Application Data

(60) Provisional application No. 63/236,162, filed on Aug. 23, 2021.

(51) Int. Cl.
*A61M 39/28* (2006.01)
*A61M 5/168* (2006.01)

(52) U.S. Cl.
CPC ...... *A61M 39/287* (2013.01); *A61M 5/16813* (2013.01); *A61M 39/28* (2013.01)

(58) Field of Classification Search
CPC .. A61M 39/28; A61M 39/286; A61M 39/287; A61M 5/16813
See application file for complete search history.

(56) References Cited

U.S. PATENT DOCUMENTS

| | | | |
|---|---|---|---|
| 3,357,674 A | 12/1967 | Coanda et al. | |
| 4,307,869 A * | 12/1981 | Mittleman | B65D 33/1625 24/130 |
| 4,434,963 A | 3/1984 | Russell | |
| 4,586,691 A | 5/1986 | Kozlow | |
| 4,689,043 A | 8/1987 | Bisha | |
| 11,058,861 B2 | 7/2021 | Pak et al. | |
| 2013/0041313 A1 | 2/2013 | Chung | |

FOREIGN PATENT DOCUMENTS

JP        S6125799 Y2  *  8/1986

OTHER PUBLICATIONS

Extended European Search Report for Application No. 22191419.5, dated Dec. 21, 2022, 9 pages.

* cited by examiner

*Primary Examiner* — Shefali D Patel
(74) *Attorney, Agent, or Firm* — MASCHOFF BRENNAN

(57) ABSTRACT

A clamp is provided. The clamp includes a flexible uniform body. The flexible uniform body includes an aperture configured to allow a tubing to pass through the flexible uniform body. The aperture is configured to allow unrestricted flow of a fluid within the tubing when the tubing is at a first position of the aperture and restrict the flow of the fluid within the tubing when the tubing is at a second position of the aperture. The flexible uniform body includes an engageable coupling mechanism disposed at a first portion of the flexible uniform body. The coupling mechanism is configured to, when engaged, cover at least a portion of a release point of the aperture such that the tubing is locked in place within a pinch point of the aperture.

20 Claims, 7 Drawing Sheets

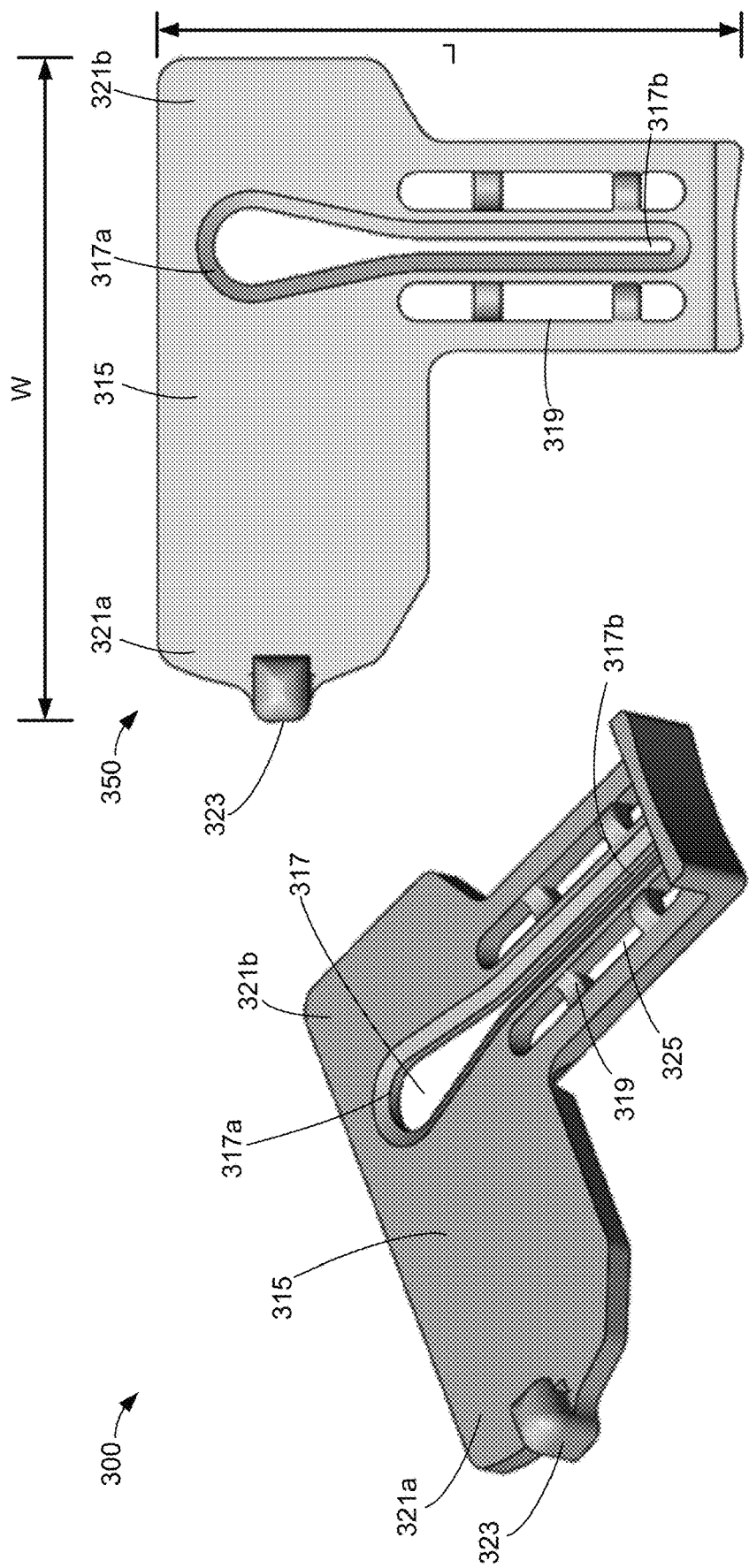

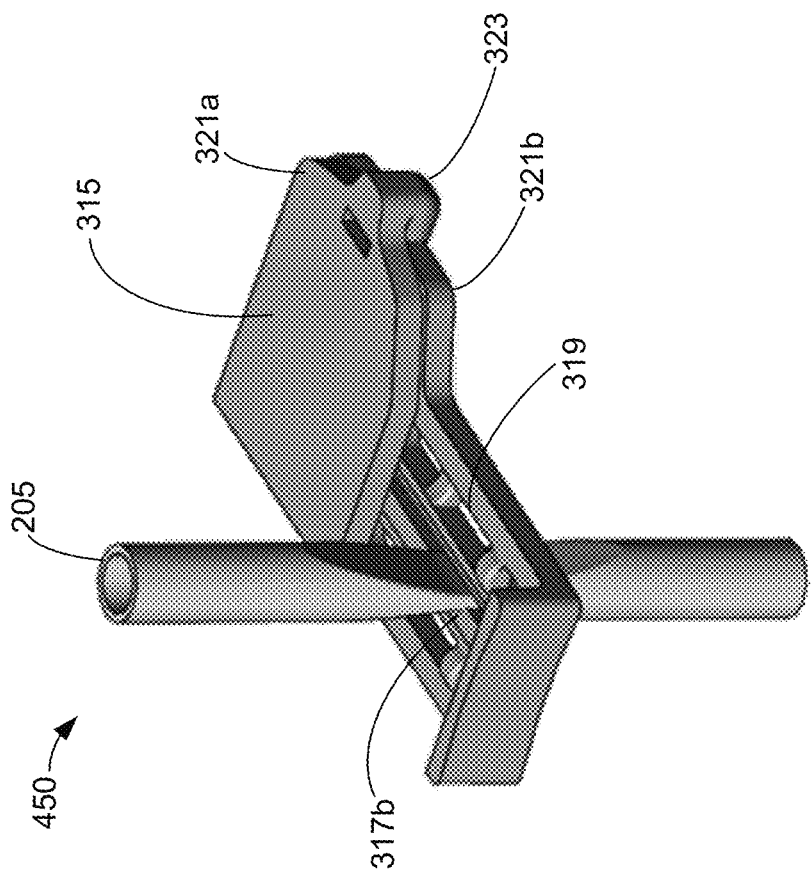
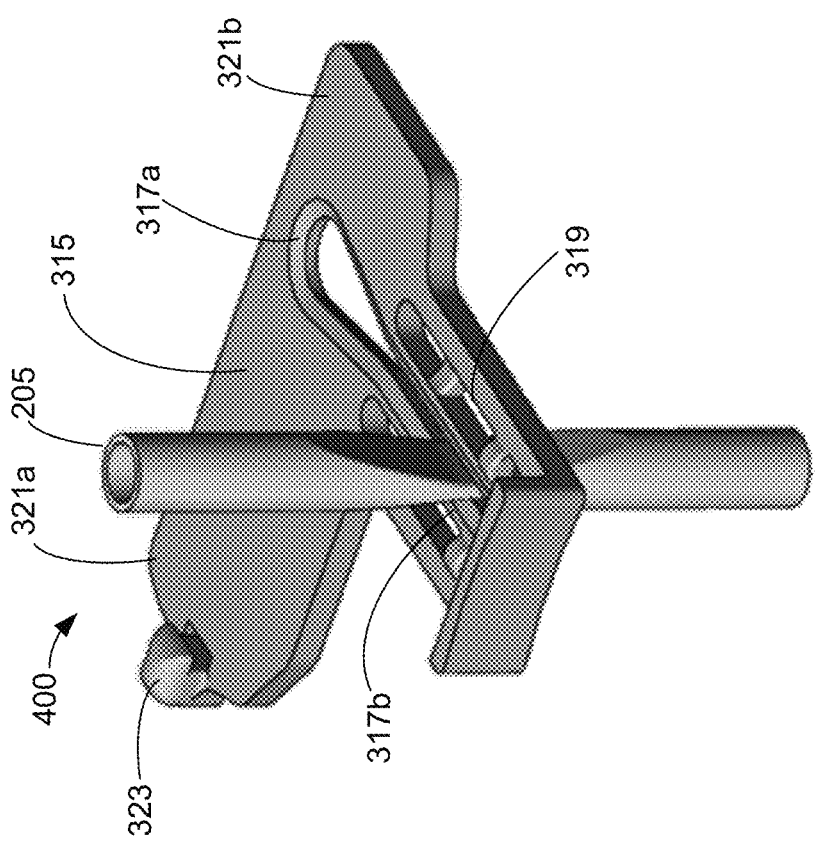
Figure 4A
Figure 4B

700

702
Position the flexible body such that the tubing is at a first end of the aperture, the first end of the aperture is a release point configured to allow unrestricted flow of a fluid within the tubing

704
Adjust a position of the flexible body such that the tubing is at a second end of the aperture, the second end of the aperture including a pinch point configured to restrict the flow of the fluid within the tubing

706
Engage the engageable coupling mechanism such that the tubing is locked in place within the pinch point of the aperture, the engageable coupling mechanism being disposed at a first portion of the flexible body and being configured to, when engaged, cover at least a portion of the release point of the aperture

708-a
Disengage the engageable coupling mechanism
708-b
Adjust the position of the flexible body such that the tubing is at the first end of the aperture such that fluid within the tubing is allowed to flow

Figure 7

LOCKING SLIDE CLAMP

CROSS-REFERENCE TO RELATED APPLICATIONS

This application claims priority to U.S. Prov. App. No. 63/236,162, filed on Aug. 23, 2021, and entitled "Locking Slide Clamp," which is incorporated herein by reference.

TECHNICAL FIELD

The present disclosure generally relates to an intravenous (IV) set or infusion pump flow restriction device, and in particular a clamp with a locking mechanism.

BACKGROUND

Medical treatments often include the infusion of a medical fluid (e.g., a saline solution or a liquid medication) to patients using an intravenous (IV) catheter that is connected though an arrangement of flexible tubing and fittings, commonly referred to as an "IV set," to a source of fluid, for example, an IV bag. Often, the flow rate through the tubing is occluded by pinching the tubing to prevent additional medical fluid from being infused to the patient. This allows medical practitioners to change medications, adjust the infusion of the medications, and stop infusing medication. However, existing clamps can be intentionally or inadvertently moved by unauthorized personnel or medical practitioners.

Thus, it is desirable to provide a reliable flow restrictor that provides a secure locking mechanism that can easily be adjusted by medical practitioners as needed.

SUMMARY

Various implementations of systems, methods, and devices within the scope of the appended claims each have several aspects, no single one of which is solely responsible for the attributes described herein. Without limiting the scope of the appended claims, after considering this disclosure, and particularly after considering the section entitled "Detailed Description" one will understand how the aspects of some implementations are used to provide a secure locking mechanism that can easily be adjusted by medical practitioners as needed. One or more implementations provide a locking slide clamp for restricting the flow of a fluid within an IV tube. The locking slide clamp includes a flexible uniform body including one or more features, all as disclosed in the drawings and specification.

In one aspect, locking slide clamp includes a flexible body including an aperture configured to allow a tubing to pass through the flexible body. A first end of the aperture includes a release point configured to allow unrestricted flow of a fluid within the tubing when the tubing is position at the first end of the aperture, and a second end of the aperture includes a pinch point configured to restrict the flow of the fluid within the tubing when the tubing is position at the second end of the aperture. The flexible body further includes an engageable coupling mechanism disposed at a first portion of the flexible body. The coupling mechanism is configured to, when engaged, cover at least a portion of the release point of the aperture such that the tubing is locked in place within the pinch point of the aperture.

In some implementations, the coupling mechanism, when engaged, couples to a second portion of the flexible body opposite the first portion such that (i) the first portion of the flexible body is folded, at least in part, over the second portion of the flexible body and (ii) the first end of the aperture is covered. In some implementations, the coupling mechanism is a clasp configured to attach to the second portion of the flexible body. In some implementations, the second portion of the flexible body includes a mating hole and the coupling mechanism is configured to couple to the mating hole. In some implementations, the first portion of the flexible body includes a hinge such that when the engageable coupling mechanism is engaged a portion of the flexible body rotates about a hinge folding over the flexible body. In some implementations, the first portion of the flexible body and the second portion of the flexible body are individual components coupled together via the hinge.

In some implementations, the flexible body includes an opening extending from an outer edge of the flexible body to the aperture, the opening configured to receive the tubing. In some implementations, the pinch point is configured to receive IV tubes of at least three different sizes. In some implementations, the pinch point is a flexible pinch point configured to receive IV tubes of at least six different sizes. In some implementations, the flexible body is molded. In some implementations, the flexible body is flexible uniform body. In some implementations, the flexible body is formed on the tubing.

In another aspect, a locking slide clamp, includes a flexible uniform body that includes an aperture configured to allow a tubing to pass through the flexible uniform body. The aperture includes a first end and a second end. The first end is a release point configured to allow unrestricted flow of a fluid within the tubing when the tubing is position at the first end of the aperture, and the second end is a pinch point configured to restrict the flow of the fluid within the tubing when the tubing is position at the second end of the aperture. The flexible uniform body further includes a coupling mechanism disposed at a first portion of the flexible uniform body. The coupling mechanism is configured to couple to a second portion of the flexible uniform body opposite the first portion such that when the first portion of the flexible uniform body is extended, at least in part, towards the second portion of the flexible uniform body the first portion of the aperture is covered and the tubing is locked in place at the second end of the aperture.

In another aspect, a method of controlling a flow of fluid within a tubing is provided. The method includes, at a flexible body coupled to the tubing, the flexible body including an aperture configured to allow a tubing to pass through the flexible body and an engageable coupling mechanism, positioning the flexible body such that the tubing is at a first end of the aperture. The first end of the aperture is a release point configured to allow unrestricted flow of a fluid within the tubing. The method further includes adjusting a position of the flexible body such that the tubing is at a second end of the aperture. The second end of the aperture includes a pinch point configured to restrict the flow of the fluid within the tubing. The method further includes engaging the engageable coupling mechanism such that the tubing is locked in place within the pinch point of the aperture. The engageable coupling mechanism is disposed at a first portion of the flexible body and is configured to, when engaged, cover at least a portion of the release point of the aperture.

In some implementations, the method further includes disengaging the engageable coupling mechanism and adjusting the position of the flexible body such that the tubing is at the first end of the aperture such that fluid within the tubing is allowed to flow.

In another aspect, a clamp for controlling a flow of fluid within a tubing a provided. The clamp includes a flexible body having a first area (e.g., first end of an aperture described below in reference to FIGS. 1-6), a second area (second end of the aperture described below in reference to FIGS. 1-6), and a transition area (e.g., connecting portion of the aperture), and an engageable coupling mechanism (described below in reference to FIGS. 1-6). The first area has a first width equal to at least a diameter of the tubing to allow unrestricted flow. The second area has a second width substantially less (e.g., at least 60% or more) than the diameter of the tubing to restrict the flow. The transition area connects the first area and the second area whereby a width of the transition area decreases from the first width to the second width. The engageable coupling mechanism is disposed at a first portion of the flexible body. The coupling mechanism is configured to, when engaged, cover at least a portion of the first area such that the tubing is locked in place within the first or second area (e.g., as discussed below in reference to FIGS. 5 and 6).

In some implementations, the coupling mechanism, when engaged, increases the rigidity of the flexible body such that the second width of the second area does not increase when the tubing is disposed in the second area. In some implementations, the clamp further includes an opening extending from an outer edge of the flexible body to the first area, the opening configured to receive the tubing. In some implementations, the coupling mechanism is a clasp configured to attach to a second portion of the flexible body. In some implementations, the second portion of the flexible body includes a mating hole and the coupling mechanism is configured to couple to the mating hole.

The foregoing and other features, aspects and advantages of the disclosed implementations will become more apparent from the following detailed description and accompanying drawings.

BRIEF DESCRIPTION OF THE DRAWINGS

The accompanying drawings, which are included to provide further understanding of the disclosure and are incorporated in and constitute a part of this specification, illustrate implementations of the disclosure and together with the description serve to explain the principles of the disclosure.

FIGS. 3A and 3B illustrate a second implementation of a locking slide clamp, in accordance with various aspects of the present disclosure.

FIGS. 4A and 4B illustrate operational use of a second implementation of a locking slide clamp, in accordance with various aspects of the present disclosure.

FIG. 7 illustrates a flow diagram of a method for controlling a flow of fluid through a tubing, in accordance with some implementations Like reference numerals refer to corresponding parts throughout the drawings.

DETAILED DESCRIPTION

Figure 1:
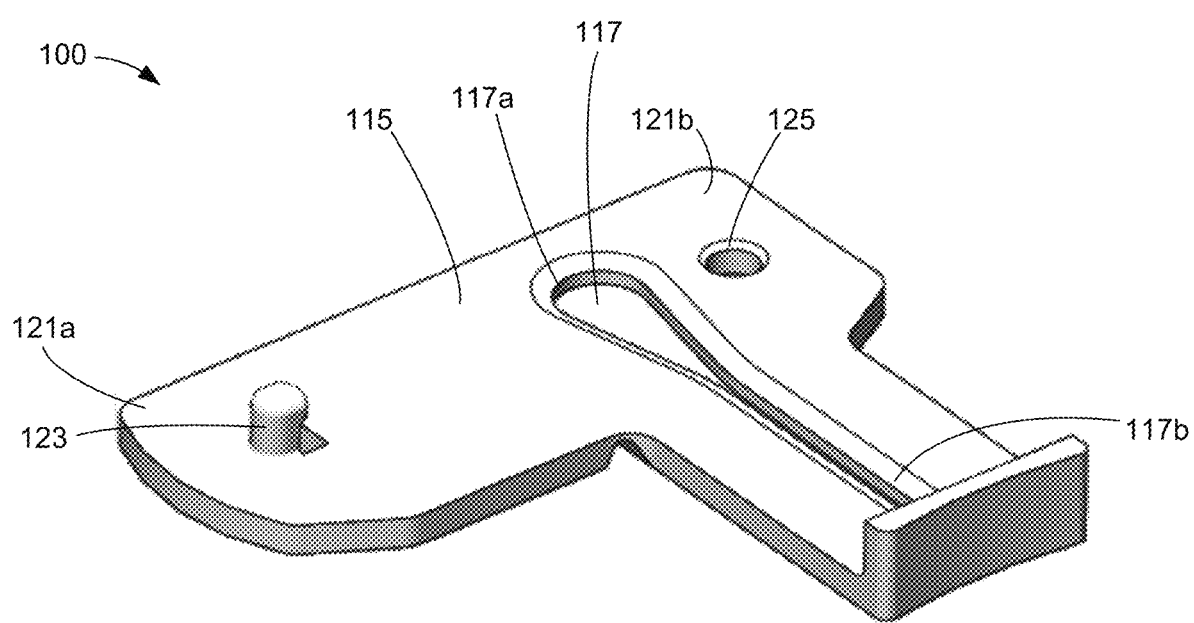
FIG. 1 illustrates a first implementation of a locking slide clamp, in accordance with various aspects of the present disclosure.
Figure 2A:
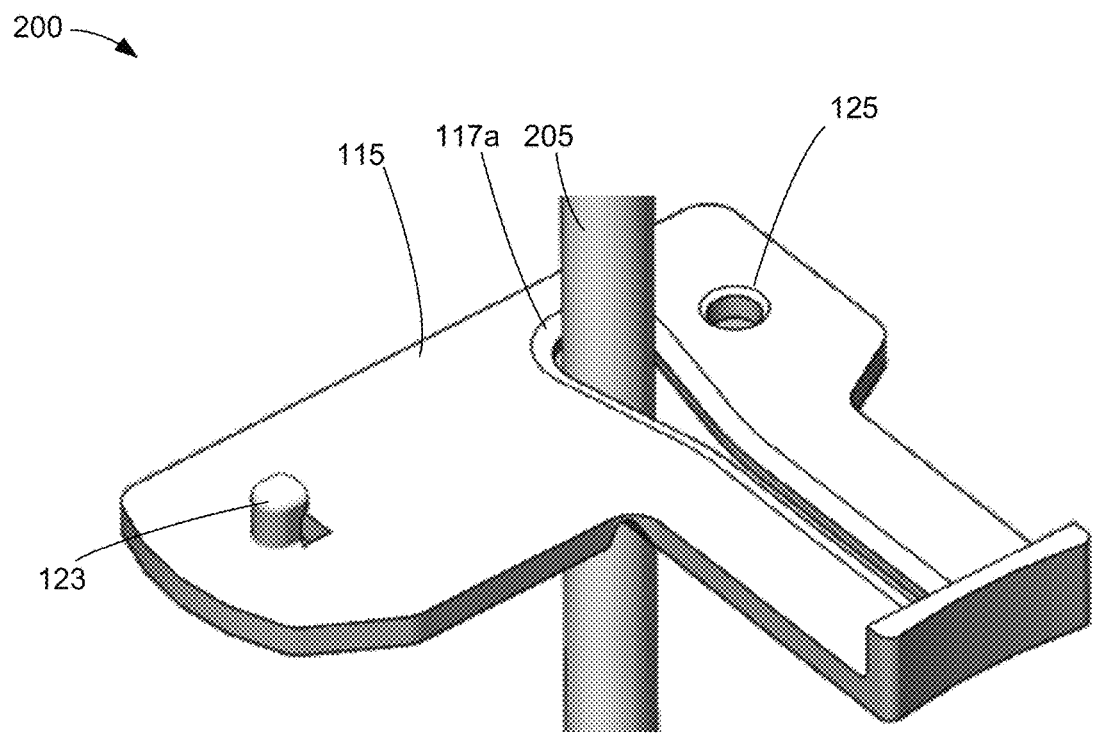
FIGS. 2A-2D illustrate operational use of a first implementation of a locking slide clamp, in accordance with various aspects of the present disclosure.
Figure 2B:
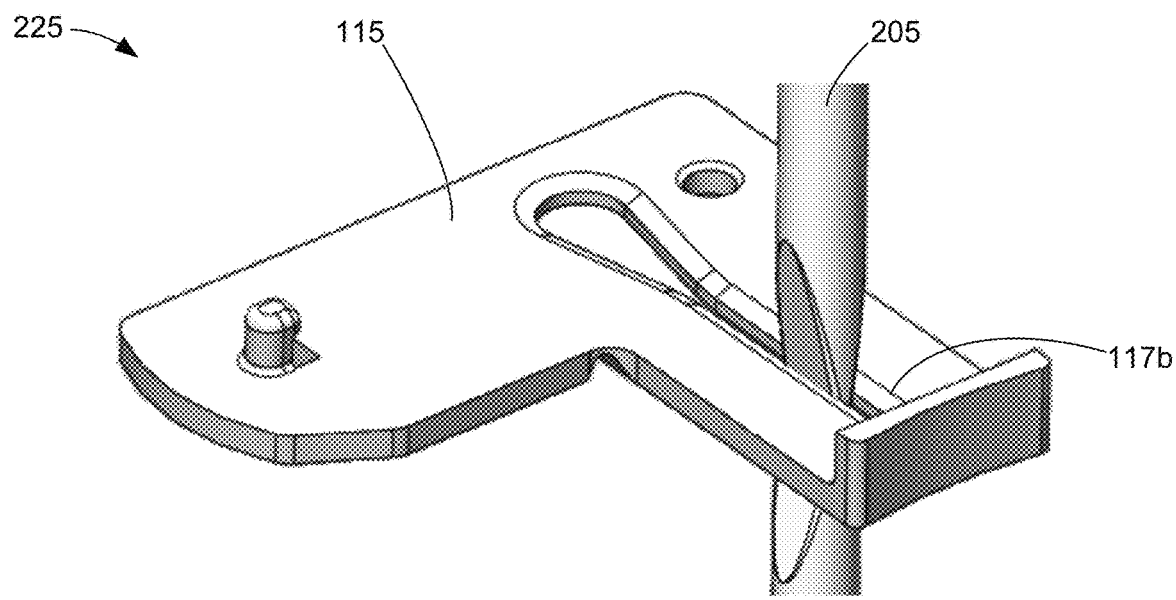
Figure 2C:
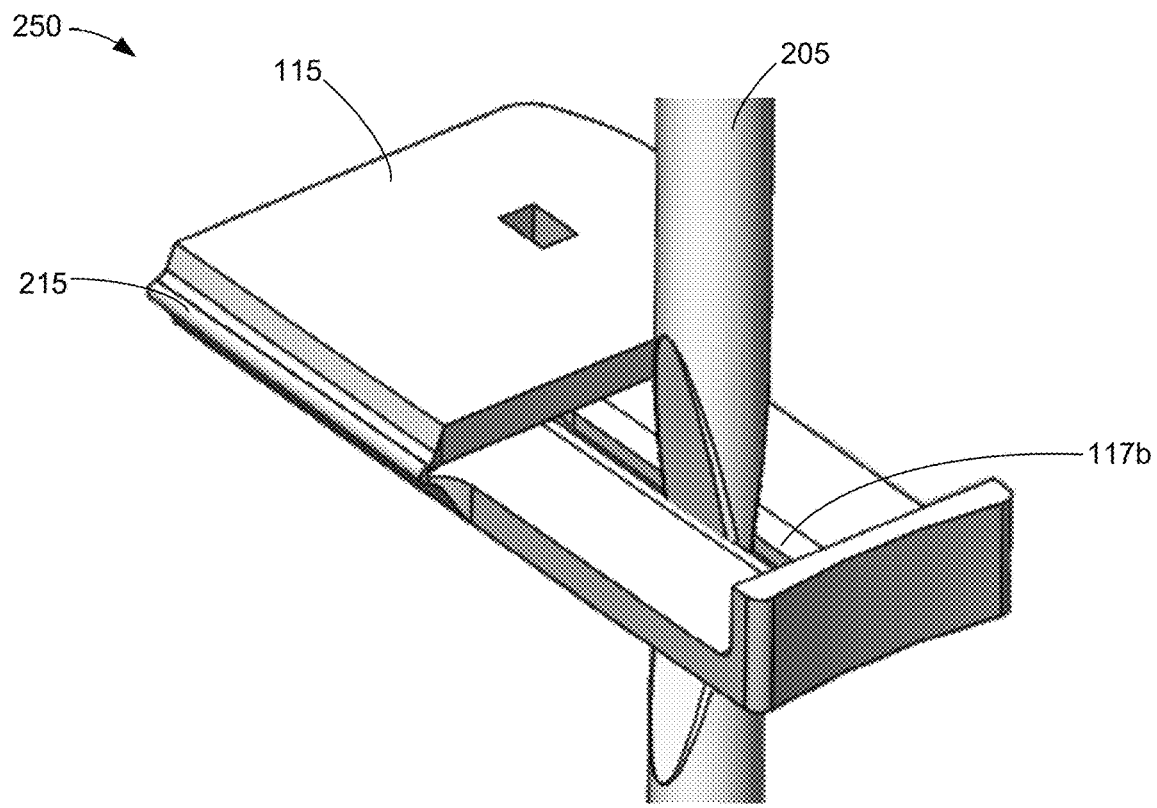
Figure 2D:
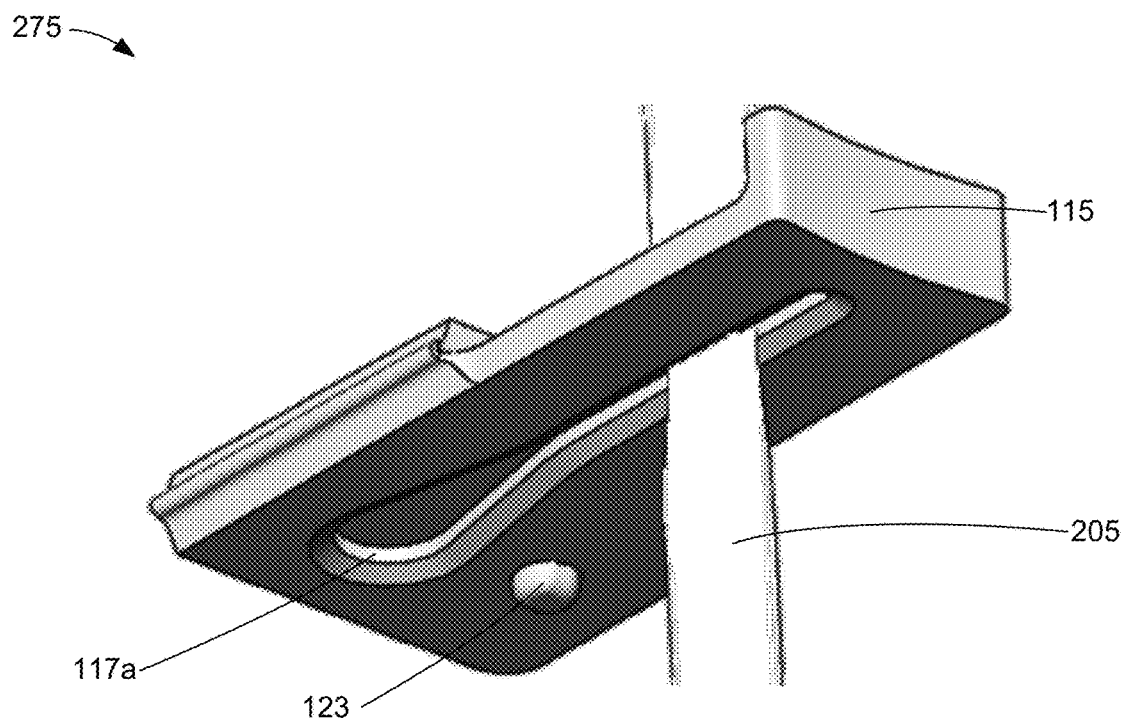

The disclosed locking slide clamp incorporates a flexible uniform body including a coupling mechanism that locks an IV set in place occluding the flow of a medical fluid within the IV set. The locking slide clamp can be single-handedly engaged to occlude flow or released to allow for the fluid to flow. The coupling mechanism prevents the unintended release of the locking slide clamp such that the medical fluid is not accidentally or unexpected infused to a patient. By preventing unintended release of the locking slide clamp, the flow rate for infusion can be safely and efficiently controlled.

The detailed description set forth below is intended as a description of various configurations of the subject technology and is not intended to represent the only configurations in which the subject technology may be practiced. The detailed description includes specific details for the purpose of providing a thorough understanding of the subject technology. However, it will be apparent to those skilled in the art that the subject technology may be practiced without these specific details. In some instances, well-known structures and components are shown in block diagram form in order to avoid obscuring the concepts of the subject technology. Like components are labeled with identical element numbers for ease of understanding. Reference numbers may have letter suffixes appended to indicate separate instances of a common element while being referred to generically by the same number without a suffix letter.

While the following description is directed to controlling and maintaining a flow rate during the administration of medical fluid using the disclosed locking slide clamp, it is to be understood that this description is only an example of usage and does not limit the scope of the claims. Various aspects of the disclosed locking slide clamp may be used in any application where it is desirable to control a fluid flow rate without permitting unintended or unauthorized changes to the flow rate.

The disclosed locking slide clamp overcomes several challenges discovered with respect to certain conventional slide clamps. One challenge with certain conventional slide clamps is that slide clamps may be inadvertently adjusted by incidental contact from patients and/or clinicians. Further, slide clamps may be intentionally adjusted by unauthorized personnel, including patients. Because the inadvertent or the unauthorized adjustment of slide clamps can alter the flow rate of the administered medical fluid, thereby potentially harming the patient, the use of conventional slide clamps is undesirable.

Therefore, in accordance with the present disclosure, it is advantageous to provide a locking slide clamp as described herein that eliminates or substantially reduces potential accidental or unauthorized adjustment of the slide clamp. The disclosed locking slide clamp provides a coupling mechanism that operates as an additional hurdle that reduces or eliminates inadvertent or unauthorized adjustment of the flow rate.

An example of a locking slide clamp that prevents inadvertent or unauthorized adjustment of the medical fluid flow rate is now described.

FIG. 1 illustrates a first implementation of a locking slide clamp, in accordance with various aspects of the present disclosure. The first implementation 100 of the locking slide clamp includes a flexible uniform body 115. In some implementations, the flexible uniform body 115 is molded. In some implementations, the flexible uniform body 115 is molded in polypropylene. Example measurements of the flexible uniform body 115 are provided below in reference to FIG. 3B. The flexible uniform body 115 includes an aperture 117 configured to allow a tubing 205 (FIG. 2) to pass through the flexible uniform body 115. The aperture 117 includes a first end 117a and a second end 117b. The first end 117a includes a release point configured to allow unrestricted flow of a fluid within the tubing 205 when the tubing is positioned at the first end 117a of the aperture 117. The second end 117b includes a pinch point configured to restrict the flow of the fluid within the tubing 205 when the tubing is positioned at the second end 117b of the aperture 117.

In some implementations, the flexible uniform body 115 includes a coupling mechanism 123 disposed at a first portion 121a of the flexible uniform body 115. In some implementations, the flexible uniform body 115 includes a mating hole 125 disposed at a second portion 121b of the flexible uniform body 115. The first portion 121a of the flexible uniform body 115 is opposite the second portion 121b of the flexible uniform body 115. The first portion 121a and the second portion 121b of the flexible uniform body 115 are perpendicular to a portion of the aperture 117 (e.g., the first end 117a). The coupling mechanism 123 is an engageable coupling mechanism disposed at a first portion of the flexible uniform body 115. The coupling mechanism is configured to, when engaged, cover at least a portion of the release point of the aperture such that the tubing is locked in place within the pinch point (e.g., the second end 117b) of the aperture. In some implementations, the coupling mechanism 123, when engaged, couples to the second portion 121b of the flexible uniform body 115 such that the first portion 121a of the flexible uniform body 115 is folded, at least in part, over the second portion 121b of the flexible uniform body 115 and the first end 117a of the aperture 117 is covered. For example, the coupling mechanism 123 is configured to couple to the mating hole 125. Use of the first implementation 100 of the locking slide clamp is described below in reference to FIGS. 2A-2D.

FIGS. 2A-2D illustrate operational use of a first implementation of a locking slide clamp, in accordance with various aspects of the present disclosure. A first operational view 200 shows the first implementation 100 (FIG. 1) of the locking slide clamp with a tubing 205 passing through the flexible uniform body 115, via aperture 117. In the first operational view 200, the tubing 205 is positioned at a first end 117a of the aperture 117. As described above in reference to FIG. 1, the first end 117a includes a release point configured to allow unrestricted flow of a fluid within the tubing 205. Further, the first operational view 200 shows the coupling mechanism 123 and the mating hole 125 not yet coupled.

A second operational view 225 shows the first implementation 100 of the locking slide clamp with the tubing 205 positioned at the second end 117b of the aperture 117 of the flexible uniform body 115. As described above in reference to FIG. 1, the second end 117b includes a pinch point configured to restrict the flow of the fluid within the tubing 205. More specifically, the second end 117b is configured to stop the flow of the fluid (represented by the pinched tubing 205). In some implementations, the second end 117b is configured receive tubing 205 of varying sizes while still restricting the flow of the fluid within the tubing 205. In some implementation, the varying tube sizes received for the second end 117b of the aperture 117 include adjacent sizes of a first tube size. For example, the second end 117b of the aperture 117 can be configured to receive a first tubing size and at least one larger tubing size and at least one smaller tubing size. In some implementations, the second end 117b (e.g., the pinch point) is configured to receive at least three different sized tubes.

A third operational view 250 shows the first implementation 100 of the locking slide clamp with the coupling mechanism 123 coupled to the mating hole 125. As described above in reference to FIG. 1, the coupling mechanism 123 is disposed at a first portion 121a of the flexible uniform body 115, and the mating hole 125 is disposed at a second portion 121b of the flexible uniform body 115. In some implementation, the first portion 121a of the flexible uniform body 115 is configured to cover a portion of the aperture 117 (e.g., the first end 117a) when the coupling mechanism 123 couples to the mating hole 125. In particular, the first portion 121a of the flexible uniform body 115 is pulled, extended, or folded, at least in part, over the second portion 121b of the flexible uniform body 115 such that the tubing 205 is locked in place at the second end 117b of the aperture 117. While the coupling mechanism 123 and the mating hole 125 are coupled, the tubing 205 cannot be accidentally or unexpected moved.

A fourth operational view 275 shows a bottom view of the first implementation 100 of the locking slide clamp when the coupling mechanism 123 is coupled to the mating hole 125. As shown in the fourth operational view 275, the coupling mechanism 123 extends, in part, through mating hole 125. The coupling mechanism 123 prevents the first portion 121a of the flexible uniform body 115 from returning to its original position (uncovering the first end 117a of the aperture 117) until it is manually removed by a user.

FIGS. 3A and 3B illustrate a second implementation of a locking slide clamp, in accordance with various aspects of the present disclosure. A first view 300 of the second implementation of the locking slide clamp includes a second flexible uniform body 315 including a second aperture 317. The second aperture 317 includes a first end 317a and a second end 317b. The second flexible uniform body 315 and the second aperture 317 are similar to and include one or more features as the flexible uniform body 115 and the aperture 117 described above in reference to FIG. 1. In some implementations, the second end 317b of the second aperture 317 is a flexible pinch point 319 configured to receive different tubing sizes. The flexible pinch point 319 is an instance of the pinch point described above in reference to FIGS. 1-2D. The flexible pinch point 319 includes a plurality of gaps 325 adjacent to the second end 317b of the second aperture 317 such that large tubing sizes can fit within the second end 317b of the second aperture 317 and still have their flow restricted. Further, the flexible pinch point 319 can be configured to be narrower than the pinch point described above in reference to FIG. 1 such that smaller tubing sizes can be accommodated. The tubing sizes that can be received by the flexible pinch point 319 are discussed below in reference to FIGS. 4A and 4B.

The second flexible uniform body 315 further includes a second coupling mechanism 323 disposed at a first portion 321a of the flexible uniform body 315. In some implementations, the second coupling mechanism 323 is a clasp configured to attach to the second portion 321b of the second flexible uniform body 315 (e.g., at an edge of the second flexible uniform body 315). The first portion 321a of the flexible uniform body 315 is opposite the second portion 321b of the flexible uniform body 315, and the first portion 321a and the second portion 321b of the flexible uniform body 315 are perpendicular to a portion of the aperture 317

(e.g., the first end 317a). In some implementations, the second flexible uniform body 315 is molded. Use of the second implementation of the locking slide clamp is described below in reference to FIGS. 4A and 4B.

A second view 350 of the second implementation of the locking slide clamp shows a sample width and length of the flexible uniform body 315. In some implementations, the flexible uniform body 315 has a length of three quarters (¾) of an inch to one (1) inch, and a width of one (1) inch to one and a half (1.5) inches. When the flexible uniform body 315 is folded (or coupled to the second portion 321b of the flexible uniform body 315) the width is approximately a half (½) of an inch to three quarters (¾) of an inch. In some implementations, the thickness of the flexible uniform body 315 approximately is 300 thousandths of an inch. For purposes of this disclosure, approximately means, in some implementations, +/-five (5) percent. The sample measurements described above for the flexible uniform body 315 can be used for each implementation described herein. Further, the sample measurements are non-limiting and different measurements can be used based on the application.

FIGS. 4A and 4B illustrate operational use of a second implementation of a locking slide clamp, in accordance with various aspects of the present disclosure. A first operational view 400 shows the second implementation of the locking slide clamp with the tubing 205 positioned at the second end 317b of the aperture 317 of the second flexible uniform body 315. As described above in reference to FIGS. 3A and 3B, the second end 317b includes a flexible pinch point 319 configured to restrict the flow of the fluid within the tubing 205. More specifically, the second end 317b is configured to stop the flow of the fluid (represented by the pinched tubing 205). In some implementations, the second end 317b is configured receive tubing 205 of varying sizes while still restricting the flow of the fluid within the tubing 205. In particular, the flexible pinch point 319 is configured to receive greater variations in tubing size than the pinch point described above in reference to FIGS. 2A-2D. In some implementation, the varying tube sizes received for the second end 317b of the aperture 317 include adjacent sizes of a first tube size. For example, the second end 317b of the aperture 317 can be configured to receive a first tubing size and at least two larger tubing sizes and at least two smaller tubing sizes. In some implementations, the second end 317b (e.g., the flexible pinch point) is configured to receive at least six different sized tubes.

A second operational view 450 shows the second implementation of the locking slide clamp with the coupling mechanism 323 coupled to the second portion 321b of the flexible uniform body 315. In particular, the coupling mechanism 323 (e.g., a clasp, hook, latch, etc.) is configured to attach to the second portion 321b of the flexible uniform body 315. As described above in reference to FIGS. 3A and 3B, the coupling mechanism 323 is disposed at a first portion 321a of the flexible uniform body 315 opposite the second portion 321b of the flexible uniform body 315. In some implementation, the first portion 321a of the flexible uniform body 315 is configured to cover a portion of the aperture 317 (e.g., the first end 317a) when the coupling mechanism 323 couples to the second portion 321b of the flexible uniform body 315. In particular, the first portion 321a of the flexible uniform body 315 extends, at least in part, towards the second portion 321b of the flexible uniform body 315 such that the tubing 205 is locked in place at the second end 317b of the aperture 117.

While the coupling mechanism 323 is coupled to the second portion 321b of the flexible uniform body 315, the tubing 205 cannot be accidentally or unexpected moved. In particular, the coupling mechanism 323 prevents the first portion 321a of the flexible uniform body 315 from returning to its original position (uncovering the first end 317a of the aperture 317) until it is manually removed by a user.

Figure 5:
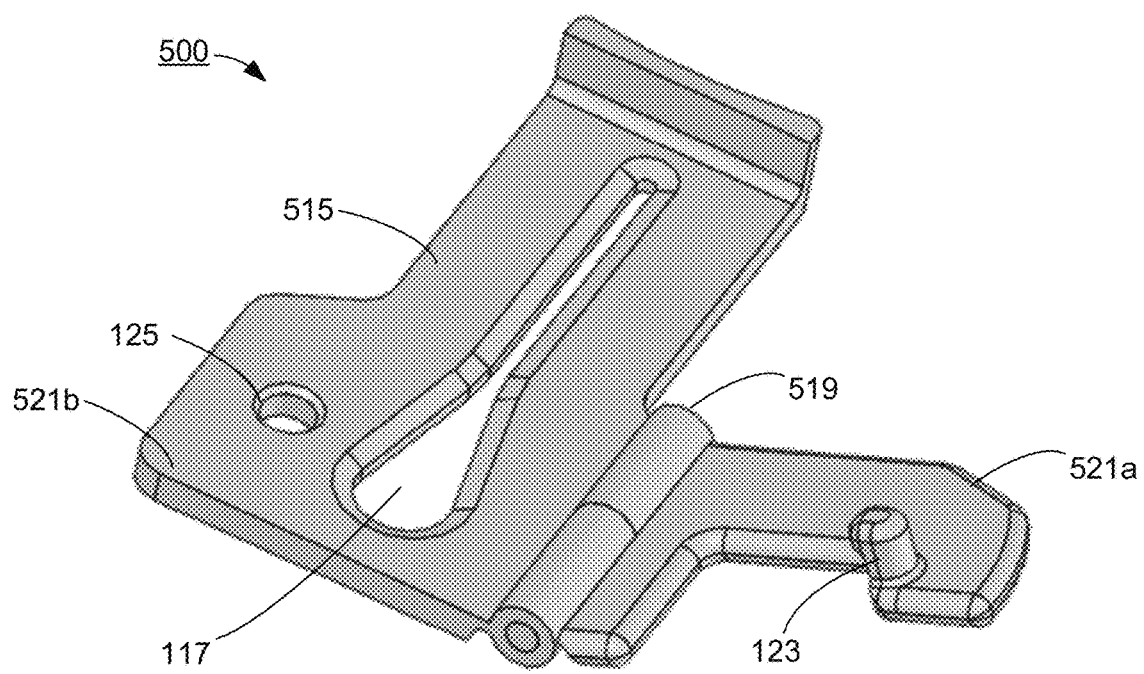
FIG. 5 illustrates a third implementation of a locking slide clamp, in accordance with various aspects of the present disclosure.

FIG. 5 illustrates a third implementation of a locking slide clamp, in accordance with various aspects of the present disclosure. The third implementation 500 of the locking slide clamp includes features similar to those described above in reference to FIGS. 1-4B. For example, the third implementation 500 of the locking slide clamp includes a third flexible body 515 including an aperture 117 configured to allow a tubing 205 (FIG. 2) to pass through the third flexible body 515. Additionally, the third flexible body 515 includes a coupling mechanism 123 disposed at a first portion 521a of the third flexible body 515 and a mating hole 125 disposed at a second portion 521b of the third flexible body 515.

In some implementations, the third flexible body 515 includes a hinge 519 (or a pin, a hook, or other mechanism) that attaches the first portion 521a of the third flexible body 515 to the second portion 521b of the third flexible body 515 (forming a single flexible body). The hinge 519 is configured to allow the first portion 521a of the third flexible body 515 to rotate about an axis and couple to the second portion 521b of the third flexible body 515. The hinge 519 is configured such that when the engageable coupling mechanism is engaged a portion of the flexible body rotates about a hinge folding (or extending) over a portion of the third flexible body 515. The hinge allows the use of a slightly more rigid flexible body that does not require the first portion 521a of the third flexible body 515 to be pulled toward the second portion 521a of the third flexible body 515.

Figure 6:
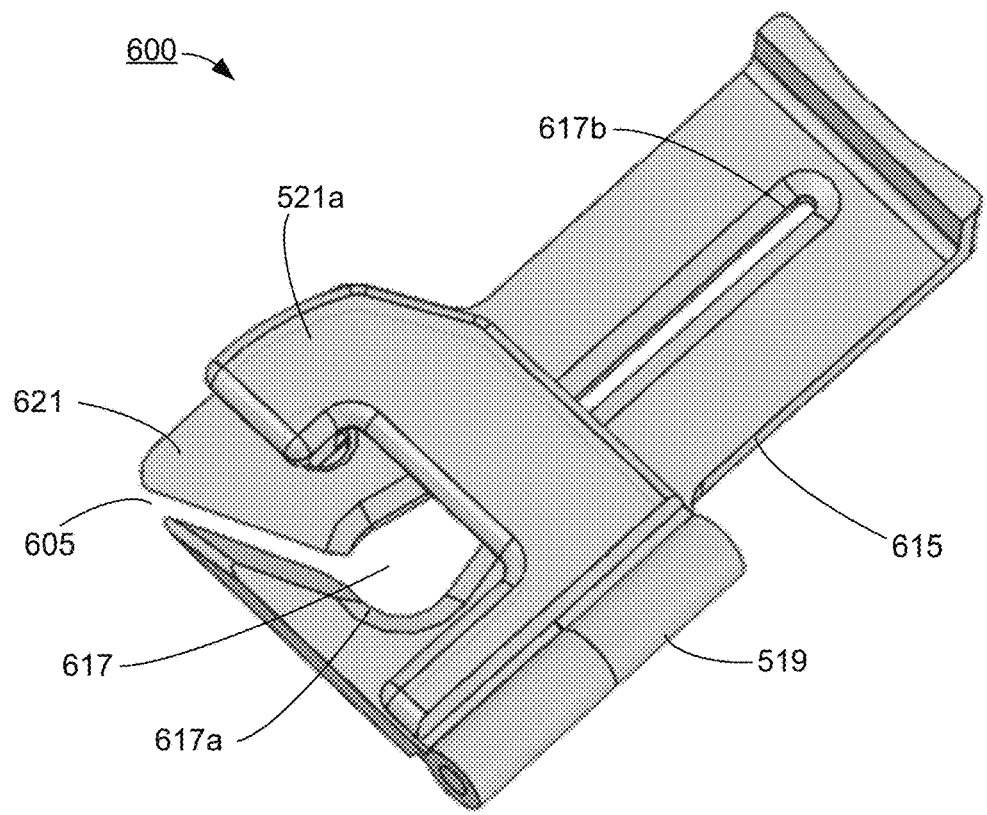
FIG. 6 illustrates a fourth implementation of a locking slide clamp, in accordance with various aspects of the present disclosure.

FIG. 6 illustrates a fourth implementation of a locking slide clamp, in accordance with various aspects of the present disclosure. The fourth implementation 600 of the locking slide clamp includes features similar to those described above in reference to FIGS. 1-5. For example, the third implementation 600 of the locking slide clamp includes a fourth flexible body 615 including an aperture 617 configured to allow a tubing 205 (FIG. 2) to pass through the fourth flexible body 615. Additionally, the fourth flexible body 615 includes a coupling mechanism 123 (FIG. 5) disposed at a first portion 521a of the fourth flexible body 615, a mating hole 125 (FIG. 5) disposed at a second portion 621b of the fourth flexible body 615, and a hinge 519 configured to allow the first portion 521a of the fourth flexible body 615 to rotate about an axis and couple to the second portion 621 of the fourth flexible body 615. In some implementations, the first portion of the flexible body 521a and the second portion of the flexible body 621 are individual components (i.e., individual bodies) coupled together by the hinge 519 to form a single flexible body (e.g., fourth flexible body 615).

The coupling mechanism 123 is configured to lock the tubing 205 in place as described above in reference to FIGS. 1-5.

In some implementations, the fourth implementation 600 of the locking slide clamp includes an opening 605 extending from an outer edge of the fourth flexible body 615 to the aperture 617. The opening 605 is configured to receive the tubing 205 or allow the tubing to be removed from the aperture 617. In some implementations, the opening 605 is narrower than the smallest tube size configured to be received by the second end (or pinch point) 617b. In some implementations, the opening 605 is slanted from the aperture 617 axis (e.g., at an angle from the first end 617a and second end 617*b* of the aperture 617 such that the opening 605 is not coincident with the first end 617*a* and second end 617*b* of the aperture 617) so that tubing 205 positioned at a first end 617*a* of the aperture 617 cannot be removed easily through the opening 605. In this way, the tubing 205 does not unintentionally come loose from the aperture 617 (e.g., a user is required to push in or pull out the tubing via the opening 605). One or both sides of opening 605 may flex to allow the tubing 205 to be received through the aperture 605. Once the tubing 205 received, into the aperture 617 and then into the second end (or pinch point) 617*b*, the aperture 617 is configured to restrict or allow flow as described above in reference to FIGS. 1-5. Further, coupling the first portion 521*a* and the second portion 621 of the fourth flexible body 615 together (via the coupling mechanism 123 and mating hole 125) adds additional rigidity to the fourth flexible body 615 such that the second end 617*b* of the aperture 617 is not able to expand. This additional rigidity prevents the second end 617*b* from decreasing the pressure applied to the tubing 205 further ensuring that the flow within the tubing 205 is restricted.

Additionally, the third and fourth flexible bodies 515 and 615 allow the tubing 205 to be locked in place at the first end of the aperture 517 and 617 by coupling mechanism 123. This prevents the flow within the tubing 205 from unintentionally being restricted. For example, the tubing 205 can be positioned at the first end 617*a* of the aperture 617 and the coupling mechanism 123 can be engaged such that the tubing 205 cannot be positioned at the second end 617*b* of the aperture 617 until the coupling mechanism 123 is disengaged and the tubing 205 is repositioned. More specifically, the third and fourth flexible bodies 515 and 615 allow the tubing 205 to be locked in place at either the first end or the second end of the aperture 517 and 617. This additional functionality operates as an additional hurdle that reduces or eliminates inadvertent or unauthorized adjustment of the flow rate.

As the skilled artisan will appreciate upon reading the descriptions provided herein, the coupling mechanisms 123 and 323 are interchangeable between the different implementations described above. For example, the coupling mechanism 123 shown in FIGS. 5 and 6 can be coupling mechanism 323 and couple with a respective portion of their flexible body (e.g., clasping to an edge instead of coupling to a mating hole (e.g., mating hole 125; FIG. 1)). Additionally, while the above examples show the position of the coupling mechanisms 123 and 323 at a respective first portion of the flexible body, the position of the coupling mechanisms 123 and 323 can be positioned at a respective second portion of the flexible body or any other portion of the flexible body that allows the tubing 205 to be locked in place at a pinch point or flexible pinch point of the flexible body. For example, the mating hole 125 disposed at the second portion 521*b* of the third flexible body 515 can be disposed at the first portion 521*a* of the third flexible body 515 and the coupling mechanisms 123 disposed at the first portion 521*a* of the third flexible body 515 can be disposed at the second portion 521*b* of the third flexible body 515.

FIG. 7 illustrates a flow diagram of a method for controlling a flow of fluid through a tubing, in accordance with some implementations. The method can be performed using any flexible body described above in reference to FIGS. 1-6.

The method 700 includes positioning (702) the flexible body such that the tubing is at a first end of the aperture. The first end of the aperture is a release point configured to allow unrestricted flow of a fluid within the tubing. The method 700 also includes adjusting (704) a position of the flexible body such that the tubing is at a second end of the aperture. The second end of the aperture includes a pinch point configured to restrict the flow of the fluid within the tubing. The method 700 further includes engaging (706) the engageable coupling mechanism such that the tubing is locked in place within the pinch point of the aperture. The engageable coupling mechanism is disposed at a first portion of the flexible body and is configured to, when engaged, cover at least a portion of the release point of the aperture.

In some implementations, the method 700 further includes disengaging (708-*a*) the engageable coupling mechanism, and adjusting (708-*b*) the position of the flexible body such that the tubing is at the first end of the aperture such that fluid within the tubing is allowed to flow.

The present disclosure is provided to enable any person skilled in the art to practice the various aspects described herein. The disclosure provides various examples of the subject technology, and the subject technology is not limited to these examples. Various modifications to these aspects will be readily apparent to those skilled in the art, and the generic principles defined herein may be applied to other aspects.

Illustration of Subject Technology as Clauses:

Various examples of aspects of the disclosure are described as numbered clauses (1, 2, 3, etc.) for convenience. These are provided as examples, and do not limit the subject technology. Identifications of the figures and reference numbers are provided below merely as examples and for illustrative purposes, and the clauses are not limited by those identifications.

Clause 1. A clamp, comprising: a flexible body including: an aperture configured to allow a tubing to pass through the flexible body, wherein: a first end of the aperture comprises a release point configured to allow unrestricted flow of a fluid within the tubing when the tubing is positioned at the first end of the aperture, and a second end of the aperture comprises a pinch point configured to restrict the flow of the fluid within the tubing when the tubing is positioned at the second end of the aperture; and an engageable coupling mechanism disposed at a first portion of the flexible body, the coupling mechanism configured to, when engaged, cover at least a portion of the release point of the aperture such that the tubing is locked in place within the pinch point of the aperture.

Clause 2. The clamp of Clause 1, wherein the coupling mechanism, when engaged, couples to a second portion of the flexible body opposite the first portion such that (i) the first portion of the flexible body is folded, at least in part, over the second portion of the flexible body and (ii) the first end of the aperture is covered.

Clause 3. The clamp of Clause 1 or Clause 2, wherein the coupling mechanism is a clasp configured to attach to a second portion of the flexible body.

Clause 4. The clamp of claim 3, wherein the second portion of the flexible body includes a mating hole and the coupling mechanism is configured to couple to the mating hole.

Clause 5. The clamp of any one of Clauses 1 through 4, wherein the pinch point is configured to receive at least three different sized intravenous tubes.

Clause 6. The clamp of Clause 5, wherein the pinch point is a flexible pinch point configured to receive at least six different sized intravenous tubes.

Clause 7. The clamp of any one of Clauses 1 through 6, wherein the first portion of the flexible body includes a hinge such that when the engageable coupling mechanism is engaged a portion of the flexible body rotates about a hinge folding over the flexible body.

Clause 8. The clamp of Clause 7, wherein the first portion of the flexible body and the second portion of the flexible body are individual components coupled together via the hinge.

Clause 9. The clamp of any one of Clauses 1 through 8, wherein the flexible body includes an opening extending from an outer edge of the flexible body to the aperture, the opening configured to receive the tubing.

Clause 10. The clamp of any one of Clauses 1 through 9, wherein the flexible body is molded.

Clause 11. The clamp of any one of Clauses 1 through 10, wherein the flexible body is flexible uniform body.

Clause 12. The clamp of any one of Clauses 1 through 8, wherein the flexible body is formed on the tubing.

Clause 13. A clamp, comprising: a flexible body including: a first area having a first width equal to at least a diameter of the tubing to allow unrestricted flow; a second area having a second width substantially less than the diameter of the tubing to restrict the flow; a transition area connecting the first area and the second area whereby a width of the transition area decreases from the first width to the second width; and an engageable coupling mechanism disposed at a first portion of the flexible body, the coupling mechanism configured to, when engaged, cover at least a portion of the first area such that the tubing is locked in place within the first or second area.

Clause 14. The clamp of Clause 13, wherein the coupling mechanism, when engaged, increases the rigidity of the flexible body such that the second width of the second area does not increase when the tubing is disposed in the second area.

Clause 15. The clamp of Clause 13 or Clause 14, further comprising an opening extending from an outer edge of the flexible body to the first area, the opening configured to receive the tubing.

Clause 16. The clamp of any one of Clauses 13 through 15, wherein the coupling mechanism is a clasp configured to attach to a second portion of the flexible body.

Clause 17. The clamp of Clause 16, wherein the second portion of the flexible body includes a mating hole and the coupling mechanism is configured to couple to the mating hole.

Clause 18. The clamp of any one of Clauses 13 through 17, wherein the flexible body is molded.

Clause 19. The clamp of any one of Clauses 13 through 18, wherein the flexible body is flexible uniform body.

Clause 20. The clamp of any one of Clauses 13 through 18, wherein the flexible body is formed on the tubing.

Further Consideration:

In some embodiments, any of the clauses herein may depend from any one of the independent clauses or any one of the dependent clauses. In one aspect, any of the clauses (e.g., dependent or independent clauses) may be combined with any other one or more clauses (e.g., dependent or independent clauses). In one aspect, a claim may include some or all of the words (e.g., steps, operations, means or components) recited in a clause, a sentence, a phrase or a paragraph. In one aspect, a claim may include some or all of the words recited in one or more clauses, sentences, phrases or paragraphs. In one aspect, some of the words in each of the clauses, sentences, phrases or paragraphs may be removed. In one aspect, additional words or elements may be added to a clause, a sentence, a phrase or a paragraph. In one aspect, the subject technology may be implemented without utilizing some of the components, elements, functions or operations described herein. In one aspect, the subject technology may be implemented utilizing additional components, elements, functions or operations.

A reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

The word "exemplary" is used herein to mean "serving as an example or illustration." Any aspect or design described herein as "exemplary" is not necessarily to be construed as preferred or advantageous over other aspects or designs. In one aspect, various alternative configurations and operations described herein may be considered to be at least equivalent.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "implementation" does not imply that such implementation is essential to the subject technology or that such implementation applies to all configurations of the subject technology. A disclosure relating to an implementation may apply to all implementations, or one or more implementations. An implementation may provide one or more examples. A phrase such an implementation may refer to one or more implementations and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

In one aspect, unless otherwise stated, all measurements, values, ratings, positions, magnitudes, sizes, and other specifications that are set forth in this specification, including in the claims that follow, are approximate, not exact. In one aspect, they are intended to have a reasonable range that is consistent with the functions to which they relate and with what is customary in the art to which they pertain.

In one aspect, the term "coupled," or the like may refer to being directly coupled. In another aspect, the term "coupled," or the like may refer to being indirectly coupled.

Terms such as "top," "bottom," "front," "rear" and the like if used in this disclosure should be understood as referring to an arbitrary frame of reference, rather than to the ordinary gravitational frame of reference. Thus, a top surface, a bottom surface, a front surface, and a rear surface may extend upwardly, downwardly, diagonally, or horizontally in a gravitational frame of reference.

Various items may be arranged differently (e.g., arranged in a different order, or partitioned in a different way) all without departing from the scope of the subject technology. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used, such term is intended to be inclusive in a manner similar to the term "comprise" as "comprise" is interpreted when employed as a transitional word in a claim.

The Title, Background, Summary, Brief Description of the Drawings and Abstract of the disclosure are hereby incorporated into the disclosure and are provided as illustrative examples of the disclosure, not as restrictive descriptions. It is submitted with the understanding that they will not be used to limit the scope or meaning of the claims. In addition, in the Detailed Description, it can be seen that the description provides illustrative examples and the various features are grouped together in various implementations for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the Detailed Description, with each claim standing on its own as a separately claimed subject matter.

The claims are not intended to be limited to the aspects described herein but is to be accorded the full scope consistent with the language claims and to encompass all legal equivalents. Notwithstanding, none of the claims are intended to embrace subject matter that fails to satisfy the requirement of 35 U.S.C. § 101, 102, or 103, nor should they be interpreted in such a way.

What is claimed is:

1. A clamp, comprising:
    a flexible body including:
        an aperture configured to allow a tubing to pass through the flexible body, wherein:
            a first end of the aperture comprises a release point configured to allow unrestricted flow of a fluid within the tubing when the tubing is positioned at the first end of the aperture, and
            a second end of the aperture comprises a pinch point configured to restrict the flow of the fluid within the tubing when the tubing is positioned at the second end of the aperture; and
        an engageable coupling mechanism disposed at a first portion of the flexible body, the coupling mechanism configured to, when engaged, cover at least a portion of the release point of the aperture such that the tubing is locked in place within the pinch point of the aperture.

2. The clamp of claim 1, wherein the coupling mechanism, when engaged, couples to a second portion of the flexible body opposite the first portion such that (i) the first portion of the flexible body is folded, at least in part, over the second portion of the flexible body and (ii) the first end of the aperture is covered.

3. The clamp of claim 1, wherein the coupling mechanism is a clasp configured to attach to a second portion of the flexible body.

4. The clamp of claim 1, wherein a second portion of the flexible body includes a mating hole and the coupling mechanism is configured to couple to the mating hole.

5. The clamp of claim 1, wherein the pinch point is configured to receive at least three different sized intravenous tubes.

6. The clamp of claim 1, wherein the pinch point is a flexible pinch point configured to receive at least six different sized intravenous tubes.

7. The clamp of claim 1, wherein the first portion of the flexible body includes a hinge such that when the engageable coupling mechanism is engaged a portion of the flexible body rotates about the hinge folding over the flexible body.

8. The clamp of claim 7, wherein the first portion of the flexible body and a second portion of the flexible body are individual components coupled together via the hinge.

9. The clamp of claim 1, wherein the flexible body includes an opening extending from an outer edge of the flexible body to the aperture, the opening configured to receive the tubing.

10. The clamp of claim 1, wherein the flexible body is molded.

11. The clamp of claim 1, wherein the flexible body is a flexible uniform body.

12. The clamp of claim 1, wherein the flexible body is formed on the tubing.

13. A clamp, comprising:
    a flexible body including:
        a first area having a first width equal to at least a diameter of a tubing to allow unrestricted flow;
        a second area having a second width substantially less than the diameter of the tubing to restrict the flow;
        a transition area connecting the first area and the second area whereby a width of the transition area decreases from the first width to the second width; and
        an engageable coupling mechanism disposed at a first portion of the flexible body, the coupling mechanism configured to, when engaged, cover at least a portion of the first area such that the tubing is locked in place within the first area or the second area.

14. The clamp of claim 13, wherein the coupling mechanism, when engaged, increases a rigidity of the flexible body such that the second width of the second area does not increase when the tubing is disposed in the second area.

15. The clamp of claim 13, further comprising an opening extending from an outer edge of the flexible body to the first area, the opening configured to receive the tubing.

16. The clamp of claim 13, wherein the coupling mechanism is a clasp configured to attach to a second portion of the flexible body.

17. The clamp of claim 13, wherein a second portion of the flexible body includes a mating hole and the coupling mechanism is configured to couple to the mating hole.

18. The clamp of claim 13, wherein the flexible body is molded.

19. The clamp of claim 13, wherein the flexible body is a flexible uniform body.

20. The clamp of claim 13, wherein the flexible body is formed on the tubing.

\* \* \* \* \*